US012768816B2

(12) United States Patent
Lagow et al.

(10) Patent No.: US 12,768,816 B2
(45) Date of Patent: Oct. 20, 2026

(54) FLUID TRANSPORT DIAGNOSTICS

(71) Applicants: Rolls-Royce Corporation, Indianapolis, IN (US); Rolls-Royce North American Technologies, Inc., Indianapolis, IN (US)

(72) Inventors: Benjamin W. Lagow, Indianapolis, IN (US); Matthew R. Gold, Indianapolis, IN (US); Taylor K. Blair, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 238 days.

(21) Appl. No.: 18/410,908

(22) Filed: Jan. 11, 2024

(65) Prior Publication Data

US 2025/0231146 A1 Jul. 17, 2025

(51) Int. Cl.

| | |
|---|---|
| ***G01N 29/024*** | (2006.01) |
| ***G01N 29/14*** | (2006.01) |
| ***G01N 29/46*** | (2006.01) |

(52) U.S. Cl.

CPC ........... *G01N 29/024* (2013.01); *G01N 29/46* (2013.01); *G01N 2291/011* (2013.01)

(58) Field of Classification Search

CPC ................. G01N 29/024; G01N 29/46; G01N 2291/011; G01N 29/032; G01N 21/85;

(Continued)

(56) References Cited

U.S. PATENT DOCUMENTS

| | | | |
|---|---|---|---|
| 10,241,091 | B2 | 3/2019 | Cybulsky et al. |
| 10,274,364 | B2 | 4/2019 | Blair et al. |

(Continued)

FOREIGN PATENT DOCUMENTS

| | | |
|---|---|---|
| CN | 102262040 A | 11/2011 |
| EP | 3309544 A1 | 4/2018 |

(Continued)

OTHER PUBLICATIONS

Response to Extended Search Report dated May 19, 2025, from counterpart European Application No. 24215307.0 filed Oct. 22, 2025, 16 pp.

(Continued)

*Primary Examiner* — Brandi N Hopkins

(74) *Attorney, Agent, or Firm* — Shumaker & Sieffert, P.A.

(57) ABSTRACT

An example system includes at least one acoustic sensor configured to generate at least one time-dependent acoustic data signal indicative of an acoustic signal generated by a system performing a fluid transport process possessing a plurality of process attributes. The fluid transport process may include a flow of a fluid along at least one path. The system may further include a computing device including an acoustic data signal processing module configured to receive the at least one time-dependent acoustic data signal, and transform the at least one time-dependent acoustic data signal to a frequency-domain spectrum. Each process attribute of the plurality of process attributes may be associated with at least one respective frequency band. The computing device may include a correlation module configured to determine a process attribute of the plurality of process attributes by identifying at least one characteristic of the frequency-domain spectrum.

17 Claims, 3 Drawing Sheets

(58) Field of Classification Search
CPC .. G01N 29/036; G01N 33/28; G01N 33/2823; G01F 1/661; G01F 1/666; G01F 1/00; G01F 1/3259; G01F 1/383; E21B 47/122; E21B 47/00; E21B 47/101; E21B 49/081; E21B 47/01; E21B 47/12; B01J 2/16; F17D 5/00; G01B 21/042; G01M 15/12; G01M 3/243; H04L 63/06; H04L 67/125; G01D 18/00; A61M 1/3413; A61M 1/3653; A61M 16/0006; A61B 5/6866; A61B 5/087; A61B 5/14532; A61B 5/02152; G05B 23/0256; A61F 5/56
See application file for complete search history.

(56) References Cited

U.S. PATENT DOCUMENTS

| | | | |
|---|---|---|---|
| 10,295,502 | B2 | 5/2019 | Clavette et al. |
| 10,695,783 | B2 | 6/2020 | Blair et al. |
| 10,724,999 | B2 | 7/2020 | Cybulsky et al. |
| 11,092,983 | B2 | 8/2021 | Cybulsky et al. |
| 11,229,954 | B2 | 1/2022 | Hall |
| 11,493,406 | B2 | 11/2022 | Yun |
| 11,534,979 | B2 | 12/2022 | Wasmer et al. |
| 2014/0200837 | A1 | 7/2014 | Blair et al. |
| 2017/0038342 | A1 | 2/2017 | Clavette et al. |
| 2020/0291772 | A1 * | 9/2020 | Thiruvenkatanathan .................... E21B 47/18 |

FOREIGN PATENT DOCUMENTS

| | | | |
|---|---|---|---|
| EP | 3336536 | A1 | 6/2018 |
| EP | 4016014 | A1 | 6/2022 |
| WO | 2019060096 | A1 | 3/2019 |

OTHER PUBLICATIONS

Extended Search Report from counterpart European Application No. 24215307.0 dated May 19, 2025, 8 pp.
U.S. Appl. No. 18/410,882, filed Jan. 11, 2024, naming inventors Gold et al.
U.S. Appl. No. 18/410,898, filed Jan. 11, 2024, naming inventors Gold et al.
U.S. Appl. No. 18/410,928, filed Jan. 11, 2024, naming inventors Blair et al.
U.S. Appl. No. 18/410,932, filed Jan. 11, 2024, naming inventors Blair et al.
U.S. Appl. No. 18/410,936, filed Jan. 11, 2024, naming inventors Lagow et al.

* cited by examiner

FLUID TRANSPORT DIAGNOSTICS

TECHNICAL FIELD

The disclosure relates to fluid transport, for example, systems and techniques for monitoring fluid transport processes.

BACKGROUND

Fluids are used in a wide variety of industrial, transportation, and power applications. For example, fluids may include fuels, heat transfer media, reaction media, suspension media, or working media. Fluids may be introduced into apparatuses, vessels, or components, transported between or within different apparatuses, vessels, or components, or from one or more sources to one or more sites. Various processes may involve the transport of fluids.

SUMMARY

In some examples, the disclosure describes a system including at least one acoustic sensor configured to generate at least one time-dependent acoustic data signal indicative of an acoustic signal. The acoustic signal is generated by a system performing a fluid transport process possessing a plurality of process attributes. The fluid transport process may include a flow of a fluid along at least one path. The system also may include a computing device that includes an acoustic data signal processing module. The acoustic data signal processing module may be configured to receive the at least one time-dependent acoustic data signal, and transform the at least one time-dependent acoustic data signal to a frequency-domain spectrum. Each process attribute of the plurality of process attributes may be associated with at least one respective frequency band. The computing device may additionally include a correlation module configured to determine a process attribute of the plurality of process attributes by identifying at least one characteristic of the frequency-domain spectrum.

In some examples, the disclosure describes a method including receiving, by a computing device, from at least one acoustic sensor, at least one time-dependent acoustic data signal indicative of an acoustic signal generated by a system performing a fluid transport process possessing a plurality of process attributes. The fluid transport process may include a flow of a fluid along at least one path. The method also may include transforming, by the computing device, the at least one time-dependent acoustic data signal to a frequency-domain spectrum. Each process attribute of the plurality of process attributes may be associated with at least one respective frequency band. Further, the method may include determining, by the computing device, a process attribute of the plurality of process attributes by identifying at least one characteristic of the frequency-domain spectrum.

In some examples, the disclosure describes a computer readable storage medium. In this example, the computer readable storage medium includes instructions that, when executed, cause at least one processor to receive, from at least one acoustic sensor, at least one time-dependent acoustic data signal indicative of an acoustic signal. The fluid transport process may include a flow of a fluid along at least one path. The acoustic signal is generated by a system performing a fluid transport process possessing a plurality of process attributes. The computer readable storage medium also may include instructions that, when executed, cause at least one processor to transform the at least one time-dependent acoustic data signal to a frequency-domain spectrum. Each process attribute of the plurality of process attributes may be associated with at least one respective frequency band. The computer readable storage medium additionally may include instructions that, when executed, cause at least one processor to determine a process attribute of the plurality of process attributes by identifying at least one characteristic of the frequency-domain spectrum.

The details of one or more examples are set forth in the accompanying drawings and the description below. Other features, objects, and advantages will be apparent from the description and drawings, and from the claims.

DETAILED DESCRIPTION

Figure 1:
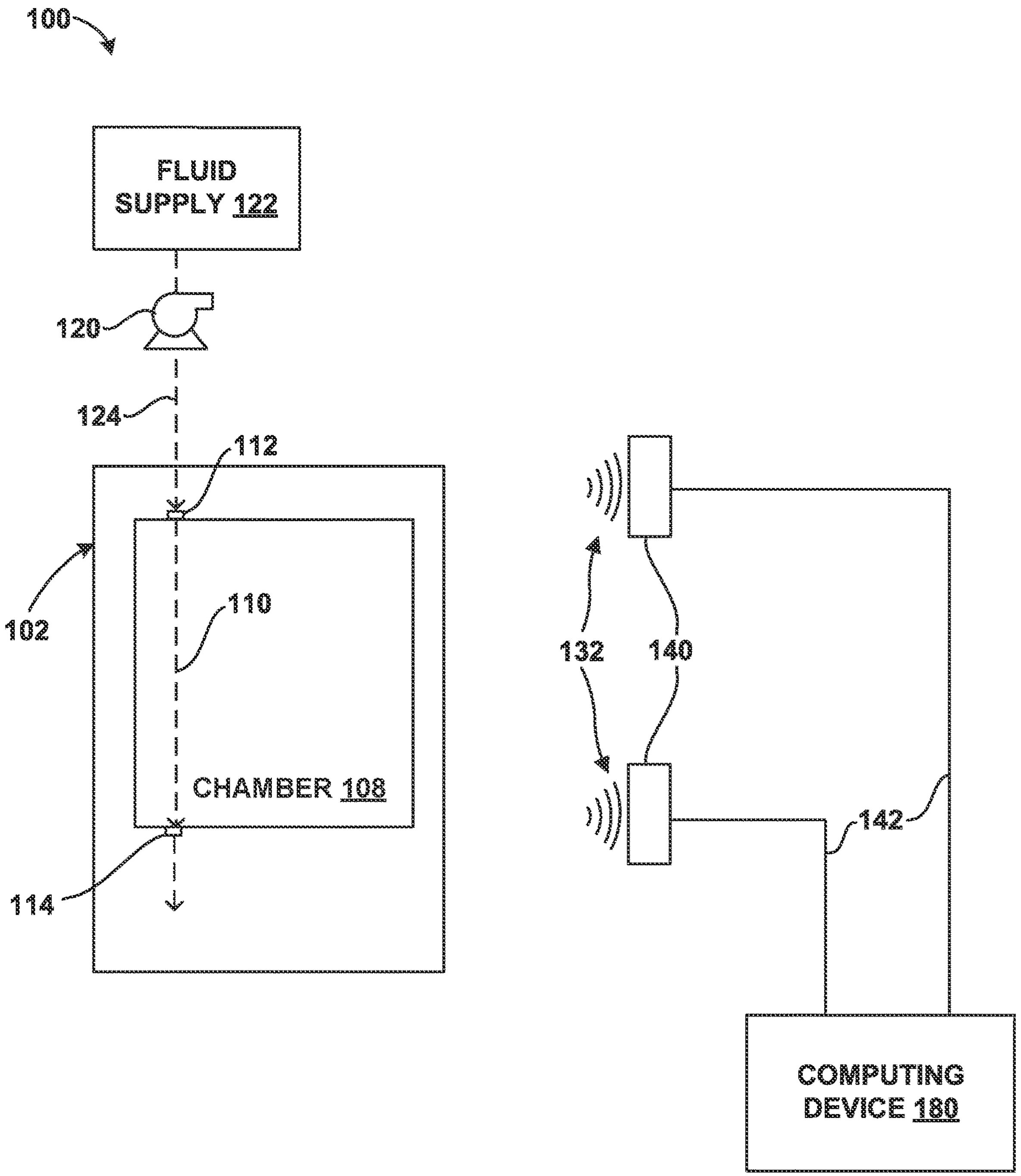
FIG. 1 is a conceptual block diagram illustrating an example system configured to perform a fluid transport process and a computing device for analyzing an acoustic signal generated by the system performing the fluid transport process possessing a plurality of process attributes to determine a process attribute of the plurality of process attributes.

The disclosure describes systems and techniques for analyzing an acoustic signal generated by a system performing a fluid transport process to determine one or more attributes of the fluid transport process, and for controlling the system. The fluid transport process may include a flow of a fluid along at least one path. The flow of fluid include fluid introduction, fluid discharge, or fluid flow, for example, to, from, or through a component, an apparent, or a fluid pathway. The fluid may include a gas, a liquid, a vapor, a suspension, or a mixture. The liquid may include, without limitation, at least one of water, inorganic solvents, organic solvents, liquid metals, suspensions, colloids, solid/liquid mixtures or suspensions (e.g., suspended solid particles in a liquid carrier). The gas may include at least one of air, carbon dioxide, nitrogen, argon, helium, steam, or any other gas, vapor, gaseous mixture, suspension, for example, solid/gas mixtures or suspensions or liquid/gas mixtures or suspensions (with a gaseous carrier).

Industrial, transportation, and power generation operations may rely on efficient transport of fluids for many purposes, including for cleaning, lubrication, actuation, and as components of chemical reactions. As fluids move through tubes, pipes, ductwork, or components, the sound generated by a fluid transport process has an acoustic signature that may be influenced by many variables, including pressure, viscosity, mass flow rate, and geometry. A change in one of these variables changes during operation may generate a characteristic change in the acoustic signature which can be monitored to record time-based information about changes in the process that can be used for multiple applications, including real-time process monitoring, health monitoring, and feedback control. Fluid ejection through nozzles, injectors, and other applications similarly may produce a characteristic acoustic signature that may be used for real-time or near-real time monitoring and additionally can be used to alert changes in geometry, for example, in ports, apertures, or fluid pathways.

During operation of a system performing a fluid transport process, the fluid transport process may generate an acoustic signal (e.g., sound). The system may include at least one acoustic sensor configured to generate at least one time-dependent acoustic data signal representative of the acoustic signal generated by the at least one component. The system also may include a computing device configured to analyze the at least one time-dependent acoustic data signal.

The time-dependent acoustic data signal may be rich in information, and may include data representative of acoustic signals generated by the fluid transport process. The acoustic signals may also be representative of process parameters or variations in process parameters. For example, the acoustic signal generated by a system component may depend upon process attributes including, for example, fluid flow rate, fluid pressure, fluid temperature, or fluid density, for example, of a fluid introduced into, discharged from, or traveling through the component. In this way, the computing device may analyze the time-dependent acoustic data signal to determine whether process attributes associated with the system are within a nominal or expected range, or if the process attributes are varying compared to an expected value. The computing device may also control at least one process attribute, or at least one component, or the system, to maintain or adjust the process attribute to be within the nominal or expected range, or within a threshold amount of the expected value.

In some examples, the system may include a plurality of acoustic sensors, and respective acoustic sensors may be positioned near respective components of the system. In some examples, each acoustic sensor of the plurality of acoustic sensors may generate a respective at least one time-dependent acoustic data signal. Because of the different positions of the respective acoustic sensors, the computing device may analyze the respective time-dependent acoustic data signals to determine information related to respective components of the system, or with fluid transport processes associated with the respective components. For example, each respective time-dependent acoustic data signal may be associated with the respective component to which the respective acoustic sensor is near. Alternatively or additionally, the computing device may utilize the intensity of respective frequency components of at least one time-dependent acoustic data signal to determine, e.g., based on distance, to which component the sound may be attributed. In this way, the computing device may analyze the time-dependent acoustic data signal or time-dependent acoustic data signals to determine process attributes for a plurality of components (or a plurality of fluid transport processes) of the system.

By utilizing the at least one time-dependent acoustic data signal, the system described herein may perform real-time or near real-time analysis or control of operation of a fluid transport process of the system. Further, monitoring a time-dependent acoustic data signal representative of one or more outputs of the system may provide a more accurate indication of process attributes of the system, e.g., compared to monitoring inputs to the system using flow meters or flow controllers. Further, in some examples, flow meters or flow controllers may require calibration, and falling out of calibration may reduce the accuracy of the feedback provided by out-of-calibration flow meters or flow controllers.

In operation, by utilizing the at least one time-dependent acoustic data signal, the systems and techniques described herein may initiate, continue, suspend, terminate, or resume system operation run in response to the time-dependent acoustic data signal. For example, the system may continue the fluid transport process in response to determining that the process conforms to specifications, may suspend the fluid transport process in response to determining that the process deviates from the specifications to allow maintenance or review of the system or operational parameters, and may resume the fluid transport process in response to determine that the process (after maintenance, review, or process change) conforms to specifications. Additionally, if the system determines, in response to the time-dependent acoustic data signal, that the fluid transport process does not conform to specifications even after maintenance or replacement, the system may suspend the run again, and generate an alert indicative of the need for further maintenance or review.

The system may, based on the at least one time-dependent acoustic data signal, perform automated control of operation of at least one component, for example, by causing operation of at least one component (or of another component, or of the system as a whole) to initiate, continue, suspend, terminate, or resume, or by modifying at least one process parameter associated with, affected by, or affecting, the at least one component, another component, or the system as a whole.

The computing device may control the system by adjusting at least one process attribute associated with at least one component of the system based on the at least one time-dependent acoustic data signal. In some examples, the computing device may adjust the process attribute by selecting at least one component based on the process attribute and determining a control signal for the component based on the comparison of the spectrum of the acoustic data signal with a baseline spectrum. The computing device may send the control signal to the selected at least one system component to adjust the process attribute. For example, the computing device may determine a control signal that controls the at least one system component to cause the process attribute to remain or be adjusted to be within a nominal or expected range, or within a threshold amount of the expected value.

Thus, example systems and techniques according to the disclosure may be used to adjust a process parameter of the system, based on an acoustic signal generated by the system. By utilizing the at least one time-dependent acoustic data signal, the system described herein may perform real-time or near real-time control of operation of at least one component of the system. Systems and techniques according to the disclosure provide near real-time feedback to an operator or a process controller for controlling components of engines to adjust process attributes, or to shut down the components or the system, as appropriate.

FIG. 1 is a block diagram illustrating an example system 100 including a component 102 and a computing device 180. Component 102 may include or define at least one chamber 108. Chamber 108 may define or include one or more of a fluid pathway 110, an inlet 112, or an outlet 114. For example, fluid may be configured to be introduced into chamber 108 via inlet 112, transported along fluid pathway 110, and released from chamber 108 via outlet 114.

Chamber 108 may further include at least one valve to control flow of fluid through one or more ports or conduits, for example, at, along, or between one or more of fluid pathway 110, inlet 112, or outlet 114. For example, chamber 108 may receive a volume of fluid from inlet 112 into an interior of chamber 108, or through fluid pathway 110, and discharge fluid through outlet 114. In some examples, component 102 includes at least one of a container, a tank, a nozzle, an injector, a port, or a turbine. Fluid pathway 110 may include at least one pipe, conduit, or passageway. Fluid pathway 110 may be defined by component 102 (for example, by a bulk or matrix of component 102), or by a sub-component of component 102.

System 100 may further include a fluid pump 120 (or some other motive element) configured to transport fluid from a fluid supply 122 along line 124 to component 102. The fluid may include a gas, a liquid, a vapor, a suspension, or a mixture. The liquid may include at least one of water, an inorganic solvent, an organic solvent, a liquid metal, a molten metal, a suspension, a colloid, a mixture (e.g., a solid/liquid mixture, a gas/liquid mixture, or a solid/gas/liquid mixture with a major phase of the mixture being liquid) or suspensions (e.g., suspended solid particles in a liquid carrier). The gas may include at least one of air, carbon dioxide, nitrogen, argon, helium, steam, or any other gas, vapor, gaseous mixture (e.g., a solid/gas mixture, a liquid/gas mixture, or a solid/liquid/gas mixture with a major phase of the mixture being gaseous), or suspension (e.g., suspended liquid and/or solid particles in a gaseous carrier).

Various components and streams of system 100 may be acoustically monitored. For example, system 100 includes at least one acoustic sensor 140. In some examples, as shown in FIG. 1, system 100 includes a plurality of acoustic sensors, such as at least two acoustic sensors 140. Each of the at least one acoustic sensor 140 is configured to sense acoustic signals 132 (e.g., sound). Acoustic signals 132 may be generated by one or more components or processes of system 100. The at least one acoustic sensor 140 may include, for example, an acoustic sensing element such as a microphone or a sound-to-electric transducer or electromagnetic, capacitive, or piezoelectric elements that generate an electrical signal in response to incident sound waves.

The flow of fluid through component 102, along fluid pathway 110, through inlet 112, through outlet 114, or otherwise through interaction of the fluid with component 102 or a sub-component of component 112 may generate at least one acoustic signal. The acoustic signal may be affected by parameters or characteristics of the fluid, of component 102, or of a combination of the fluid and component 102. Such an acoustic signal may be indicative of a fluid transport process performed by system 100, for example, flow of the fluid along fluid pathway 110.

The at least one acoustic sensor 140 may be configured to sense acoustic signals 132 with a predetermined wavelength or wavelength range. In some examples, the at least one acoustic sensor 140 may be configured to sense acoustic signals 132 that may or may not be detectable by human hearing, including infrasound and ultrasound. In some examples, acoustic signals 132 may include frequencies below about 20 Hz, from about 20 Hz to about 20 kHz, from about 20 kHz to about 2 MHz, higher than about 2 MHz, or combinations thereof. Each acoustic sensor of the at least one acoustic sensor 140 is configured to generate a respective time-dependent acoustic data signal of at least one time-dependent acoustic data signal 142 based on the sensed acoustic signal 132 and communicate at least one time-dependent acoustic data signal 142 to computing device 180. In some examples, at least one time-dependent acoustic data signal 142 includes a digital data signal, and at least one acoustic sensor 140 includes an analog-to-digital converter. In other examples, at least one time-dependent acoustic data signal 142 may include an analog signal. In some examples, at least one acoustic sensor 140 may include an amplifier to amplify the signal sensed by at least one acoustic sensor 140 and produce the at least one time-dependent acoustic data signal 142. At least one acoustic sensor 140 may transmit at least one time-dependent acoustic data signal 142 using electrical signals, Bluetooth, Wi-Fi, radio, or any other suitable transmission pathway.

Computing device 180 may be configured to control operation of one or more components of system 100 automatically or under control of a user. For example, computing device 180 may be configured to control operation of one or more of component 102, chamber 108, fluid pathway 110, inlet 112, outlet 114, pump 120, fluid supply 122, or line 124, at least one acoustic sensor 140, and the like. Computing device 180 also may be configured to receive at least one time-dependent acoustic data signal 142 from at least one acoustic sensor 140 and analyze the at least one time-dependent acoustic data signal 142 to determine one or more process attributes of system 100.

System 100 is configured to perform at least one process, for example, including a flow of a fluid along at least one path. System 100 and the fluid transport process performed by system 100 possess a plurality of process attributes. The process attributes may include process parameters, component wear, and the like. Process parameters may deviate from designed or nominal values. Computing device 180 may be configured to compare the process deviations to the nominal or designed process parameters. For example, process parameters may include at least one of a temperature, a pressure, a mass flow rate, a volumetric flow rate, a molecular flow rate, a molar flow rate, a composition or a concentration, of a flowstream flowing through component 102, for instance, of fluid entering chamber 108 through inlet 112, fluid flowing along fluid pathway 110, exiting chamber 108 through outlet 114, or flowing through pump 120 or line 124, or in fluid supply 122. In some examples, the process deviations includes at least one of flow fluctuation, flow reduction, or blockage (for e.g., at, along, or between one or more of chamber 108, fluid pathway 110, inlet 112, outlet 114, pump 120, fluid supply 122, or line 124), leakage, or a process deviation resulting from incompatibility (for e.g., wrong type or configuration of a component, for instance, introduced during manufacturing or repair) or wear or blockage of the at least one component. In some examples, wear or blockage of the at least one component may include wear or blockage of chamber 108, fluid pathway 110, inlet 112, outlet 114, pump 120, fluid supply 122, or line 124, or a valve.

As described above, components of system 100 and processes performed by system 100 generate acoustic signals 132 during the fluid transport process. For example, acoustic signals 132 may originate from chamber 108, fluid pathway 110, inlet 112, outlet 114, pump 120, fluid supply 122, or line 124, or any other component associated with component 102, such as a valve, a blower, a compressor, a piston, or the like.

Acoustic signals 132 generated by the components depend on process attributes, and may change in response to process attributes changing. For example, acoustic signals 132 produced by chamber 108, fluid pathway 110, inlet 112, outlet 114, pump 120, fluid supply 122, or line 124 may change in response to any one or more of the temperature, pressure, flowrate, viscosity, composition, or concentration of the flowstream in the respective components changing. In some examples, respective process attributes may be associated with one or more respective frequency bands within acoustic signals 132. For example, a peak frequency may be associated with fluid pathway 110 or component 102 as a whole, and may change with wear within fluid pathway 110 or component 102. Other process attributes may similarly be associated with respective frequencies or frequency bands, which may change in frequency value, intensity, or the like, based on the value of the process attribute.

In some examples, acoustic signals 132 may be affected by the portion of the fluid transport process which is being performed. For example, acoustic signals 132 generated during an initial introduction of fluid in component 102 may differ from acoustic signals 132 generated when fluid is flowing through component 102 continuously, or acoustic signals 132 generated when system 100 is being shut down. Hence, computing device 180 may analyze at least one time-dependent acoustic data signal 142 to determine at which portion of the fluid transport process system 100 is, or a user may identify the portion of the fluid transport process at which system 100 is, and computing device 180 may utilize this information when analyzing at least one time-dependent acoustic data signal 142.

Other factors may result in acoustic signals 132 changing. For example, acoustic signals 132 generated by components of system 100 in a first configuration may differ acoustic signals 132 generated in a second configuration. In some examples, computing device 180 may analyze a respective time-dependent acoustic data signal of at least one time-dependent acoustic data signal 142 to identify the configuration of components of system 100, or the stage or progress of a process performed by system 100, or a stage or progress of a subprocess performed by one or more components of system 100. In some examples, computing device 180 may identify the process stage or cycle at which system 100 is operating by comparing a respective time-dependent acoustic data signal of at least one time-dependent acoustic data signal 142 of system 100 in the unknown process stage to a time-dependent acoustic data signal from a known configuration or process stage of a system.

In some examples, at least one acoustic sensor 140 may be configured to enhance detection of one or more acoustic signal of acoustic signals 132 compared to another one or more acoustic signal of acoustic signals 132. For instance, a first acoustic sensor of at least one acoustic sensor 140 may be positioned adjacent to a selected component of system 100, oriented toward a selected component of system 100, or the like to enhance detection of a selected acoustic signal of acoustic signals 132 compared to another one or more acoustic signal of acoustic signals 132. For example, a first acoustic sensor of at least one acoustic sensor 140 may be positioned to sense acoustic signals 132 originating from inlet 112, and a second acoustic sensor of at least one acoustic sensor 140 may be positioned to sense acoustic signals 132 originating from outlet 114. The at least one acoustic sensor 140 may be located near a component or at a zone within system 100, or may be oriented towards a component to sense sound from the component, or otherwise more accurately attribute the sound to a source. In an example, at least one acoustic sensor 140 may include multiple acoustic sensors forming an acoustic sensor network that captures sound generated by various components system 100.

As described above, computing device 180 may analyze at least one time-dependent acoustic data signal 142 to determine information about one or more process attributes of system 100, which may include, for example, a component configuration, component wear or blockage, process parameters, or process deviations of system 100. For example, computing device 180 may be configured to receive the at least one time-dependent acoustic data signal 142, transform the at least one time-dependent acoustic data signal 142 to a frequency-domain spectrum, and determine a process attribute by identifying at least one characteristic of the frequency-domain spectrum. As described above, each of the plurality of process attributes of system 100 may be associated with at least one respective frequency band. In some examples, computing device 180 may analyze at least one time-dependent acoustic data signal 142 to determine whether process attributes associated with the process performed by system 100 are within a nominal or expected range, or if the process attributes are varying compared to the nominal or expected range.

In some examples, because of the different positions of at least one acoustic sensor 140, computing device 180 may analyze the at least time-dependent acoustic data signal 132 to determine information related to particular components of system 100. For example, computing device 180 may utilize the intensity of respective frequency components of at least one time-dependent acoustic data signal 142 to determine a distance from the acoustic sensor from which the at least one time-dependent acoustic data signal 142 was received to the component generating the acoustic signal, and may attribute the acoustic signal to that component. Additionally or alternatively, computing device 180 may utilize data indicative of the position and/or orientation of the acoustic sensor from which the at least one time-dependent acoustic data signal 142 was received relative to a selected component to the acoustic signal to a component. In this way, computing device 180 may analyze the at least one time-dependent acoustic data signal 142 or multiple time-dependent acoustic data signals to determine process attributes for a plurality of components of the system.

In some examples, computing device 180 may analyze at least one acoustic data signal 142 to identify process attributes, including process parameters, component wear or blockage, or both that may result in unsatisfactory product characteristics or other undesirable conditions of system 100. In some examples, by utilizing at least one time-dependent acoustic data signal 142, computing device 180 may perform real-time or near-real-time analysis or control of the operation of system 100. For example, monitoring a signal representative of one or more streams passing through or generated by system 100 may provide a more accurate indication of process attributes of system 100, e.g., compared to monitoring inputs to system 100 using a flow meter or a flow controller.

Figure 2:
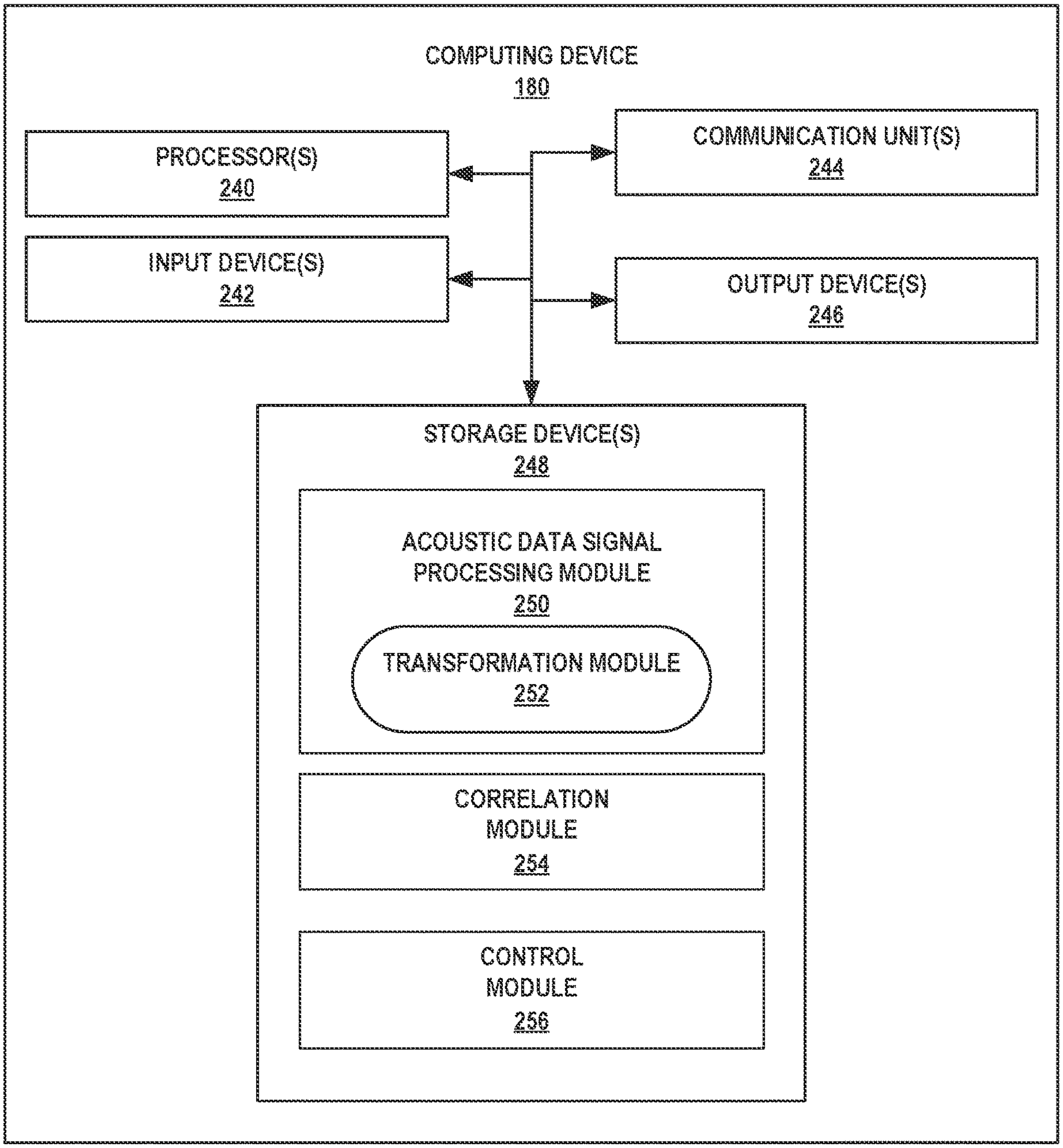
FIG. 2 is a conceptual block diagram illustrating an example of a computing device for analyzing an acoustic signal generated by a system performing a fluid transport process possessing a plurality of process attributes to determine a process attribute of the plurality of process attributes.

FIG. 2 is a conceptual block diagram illustrating an example of computing device 180 illustrated in FIG. 1. In some examples, computing device 180 may include, for example, a desktop computer, a laptop computer, a workstation, a server, a mainframe, a cloud computing system, or the like. In some examples, computing device 180 controls the operation of system 100, including, for example, system 100 generally, or one or more components such as component 102, chamber 108, fluid pathway 110, inlet 112, outlet 114, pump 120, fluid supply 122, or line 124, or acoustic sensors 140.

In the example illustrated in FIG. 2, computing device 180 includes one or more processors 240, one or more input devices 242, one or more communication units 244, one or more output devices 246, and one or more storage devices 248. In some examples, one or more storage devices 248 stores acoustic data signal processing module 250, transformation module 252, correlation module 254, or system control module 256. In other examples, computing device 180 may include additional components or fewer components than those illustrated in FIG. 2.

One or more processors 240 are configured to implement functionality and/or process instructions for execution within computing device 180. For example, processors 240 may be capable of processing instructions stored by storage device 248. Examples of one or more processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 248 may be configured to store information within computing device 180 during operation. Storage devices 248, in some examples, include a computer-readable storage medium or computer-readable storage device. In some examples, storage devices 248 include a temporary memory, meaning that a primary purpose of storage device 248 is not long-term storage. Storage devices 248, in some examples, include a volatile memory, meaning that storage device 248 does not maintain stored contents when power is not provided to storage device 248. Examples of volatile memories include random access memories (RAM), dynamic random access memories (DRAM), static random access memories (SRAM), and other forms of volatile memories known in the art. In some examples, storage devices 248 are used to store program instructions for execution by processors 240. Storage devices 248, in some examples, are used by software or applications running on computing device 180 to temporarily store information during program execution.

In some examples, storage devices 248 may further include one or more storage device 248 configured for longer-term storage of information. In some examples, storage devices 248 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 180 further includes one or more communication units 244. Computing device 180 may utilize communication units 244 to communicate with external devices (e.g., pump 120 or acoustic sensor 140) via one or more networks, such as one or more wired or wireless networks. Communication unit 244 may include a network interface card, such as an Ethernet card, an optical transceiver, a radio frequency transceiver, or any other type of device that can send and receive information. Other examples of such network interfaces may include WiFi radios or Universal Serial Bus (USB). In some examples, computing device 180 utilizes communication units 244 to wirelessly communicate with an external device such as a server.

Computing device 180 also includes one or more input devices 242. Input devices 242, in some examples, are configured to receive input from a user through tactile, audio, or video sources. Examples of input devices 242 include a mouse, a keyboard, a voice responsive system, video camera, microphone, touchscreen, or any other type of device for detecting a command from a user.

Computing device 180 may further include one or more output devices 246. Output devices 246, in some examples, are configured to provide output to a user using audio or video media. For example, output devices 246 may include a display, a sound card, a video graphics adapter card, or any other type of device for converting a signal into an appropriate form understandable to humans or machines. In some example, computing device 180 outputs a representation of one or more of the at least one time-dependent acoustic data signal 142, of the frequency-domain spectrum, of the at least one characteristic of the frequency-domain spectrum, or of the process attribute that the at least one characteristic is indicative of, via output devices 246.

In some examples, computing device 180 may generate an alert in response to the least one attribute, via output devices 246. For example, computing device 180 may generate auditory signals, such as a beep, an alert tone, or an alerting sound, or visual signals, such as an icon on a display, flashing lights, or a combination of visual and audible signals, to indicate a process attribute variance or a process attribute deviation. In some examples, the alert signal may indicate a particular component in need of maintenance or replacement, for example, component 102, pump 120, or another component. In some examples, an operator may thus be alerted, and may choose to investigate system 100 or component 102. As another example, computing device 180 may generate an alert that is transmitted over a network to another computing device, including a hand-held computing device, for instance, a cellphone. The alert signal may include information about the process attribute, for instance, a process parameter, or a variance in the process parameter, or a process deviation status, or an identification of the process deviation.

Computing device 180 also may include an acoustic data signal processing module 250 and a correlation module 254. In some examples, acoustic data signal processing module 250 pre-processes or processes at least one time-dependent acoustic data signal 142 to prepare at least one time-dependent acoustic data signal 142 for analysis by correlation module 254, and correlation module 254 analyzes at least one time-dependent acoustic data 142 signal to determine the process attribute. In some examples, acoustic data signal processing module 250 may include a transformation module 252 for transforming at least one time-dependent acoustic data signal 142 from a time-domain spectrum to a frequency-domain spectrum. Functions performed by acoustic data signal processing module 250, transformation module 252 and correlation module 254 are explained below with reference to the example flow diagram illustrated in FIG. 3.

Acoustic data signal processing module 250, transformation module 252, and correlation module 254 may be implemented in various ways. For example, acoustic data signal processing module 250, transformation module 252, and/or correlation module 254 may be implemented as software, such as an executable application or an operating system, or firmware executed by one or more processors 240. As such, one or more of processors 240 may be configured to perform the functionality ascribed to one or more of acoustic data signal processing module 250, transformation module 252, and/or correlation module 254. In other examples, acoustic data signal processing module 250, transformation module 252, and/or correlation module 254 may be implemented as part of a hardware unit of computing device 180. In some examples, acoustic data signal processing module 250 includes transformation module 252, as shown in FIG. 2. In some examples, transformation module 252 is separate from acoustic data signal processing module 250.

Computing device 180 also may include system control module 256. System control module 256 may be configured to, based on predetermined specifications, control one or more components of system 100 to perform a fluid transport process. For example, system control module 256 may send a control signal to one or more components, or receive a signal from one or more sensors. In some examples, the control signal controls at least one valve or pump configured to control, cause, allow, or prevent flow of fluid through component 102, or through chamber 108.

Computing device 180 may include additional components that, for clarity, are not shown in FIG. 2. For example, computing device 180 may include a power supply to provide power to the components of computing device 180. Similarly, the components of computing device 180 shown in FIG. 2 may not be necessary in every example of computing device 180.

Examples of system 100 and computing device 180 are described with reference to FIGS. 1 and 2 above, including examples of at least one acoustic sensor 140 for generating at least one time-dependent acoustic data signal 142 indicative of acoustic signals 132 generated by system 100. Example techniques for analyzing at least one time-dependent data signals to determine a process attribute of a process performed by system 100, as an example, are described with reference to FIG. 3 below. However, the technique of FIG. 3 may be used to analyze any system according to the present disclosure.

Figure 3:
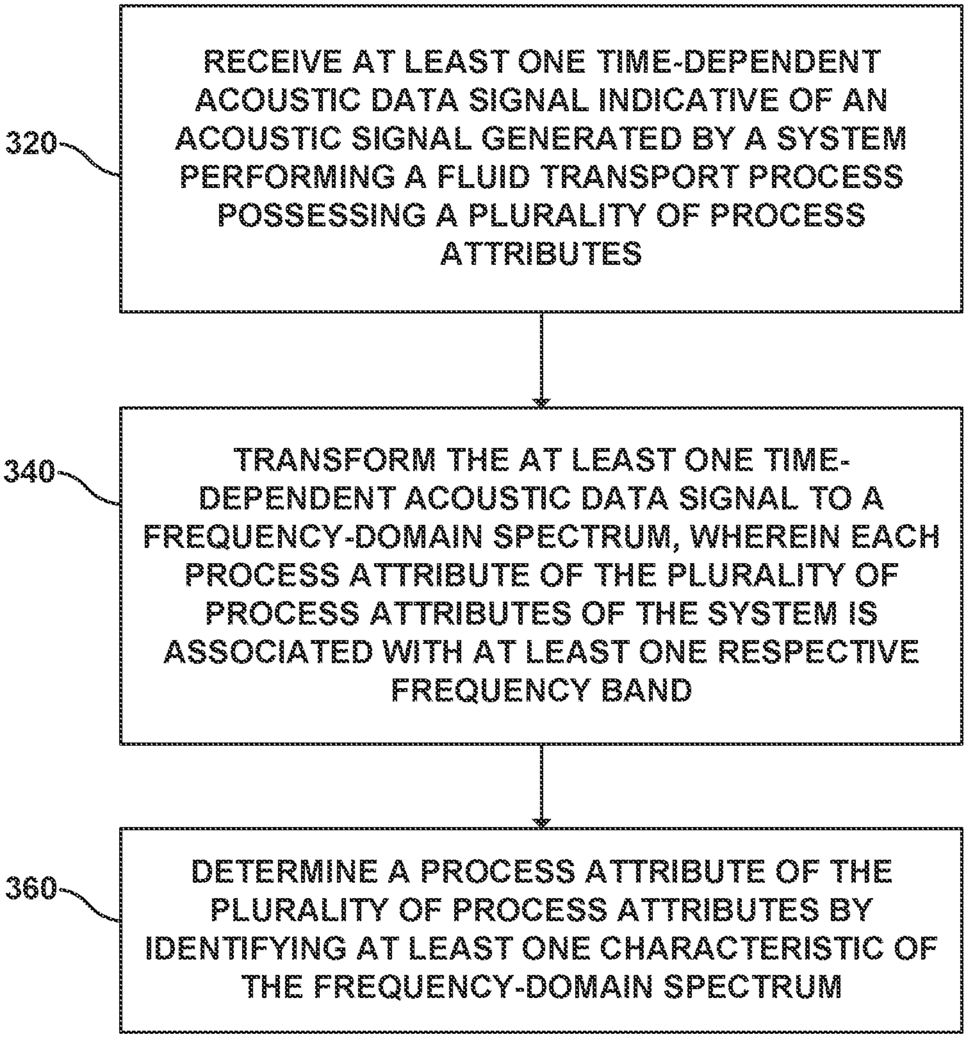
FIG. 3 is a flow diagram illustrating an example technique for analyzing an acoustic signal generated by a system performing a fluid transport process possessing a plurality of process attributes to determine a process attribute of the plurality of process attributes.

FIG. 3 is a flow diagram illustrating an example technique for analyzing an acoustic signal generated by a system performing a fluid transport process possessing a plurality of process attributes to determine a process attribute of the plurality of process attributes. The fluid transport process may include a flow of a fluid along at least one path (for example, along component 102, chamber 108, or fluid pathway 110). In some examples, a computing device, such as computing device 180, may implement the technique of FIG. 3 to analyze the at least one time-dependent signal 142 indicative of acoustic signals 132 generated by system 100 performing a process possessing a plurality of process attributes, described in various examples with reference to FIG. 1 above, to determine a process attribute of the plurality of process attributes. The technique of FIG. 3 will be described with reference to system 100 of FIG. 1, and computing device 180 of FIGS. 1 and 2, for purposes of description only. It will be appreciated that the technique of FIG. 3 may be used to analyze at least one acoustic data signal to determine a process attribute of processes performed by other systems, that other computing devices may implement the technique of FIG. 3, or both.

The technique of FIG. 3 includes receiving, by computing device 180, from at least one acoustic sensor 140, at least one time-dependent acoustic data signal 142 indicative of acoustic signals 132 generated by system 100 (e.g., by component 102, or one or more components of system 100, or system 100 as a whole) (320). In some examples, at least one time-dependent acoustic data signal 142 may include analog signals, and acoustic data signal processing module 250 of computing device 180 may process at least one acoustic data signal 142 by performing an analog-to-digital conversion. In other examples, the received at least one time-dependent acoustic data signal 142 may include digital signals and acoustic data signal processing module 250 may not perform analog-to-digital conversion of at least one time-dependent acoustic data signal 142. In some examples, acoustic data signal processing module 250 of computing device 180 may filter at least one acoustic data signal 142 through signal processing filters such as band pass filters, high pass filters, low pass filters, comb filters, notch filters, or other filters, for instance, deconvolution filters, or noise filters to filter out undesirable signal components, such as noise, superfluous signal components, such as harmonics, or to reduce or compress the information in at least one acoustic data signal 142.

The technique of FIG. 3 also includes transforming, by transformation module 252 of computing device 180, at least one time-dependent acoustic data signal 142 to a frequency-domain spectrum (340). The frequency-domain spectrum may include intensity or amplitude as a function of frequency. In some examples, transformation module 252 of computing device 180 transforms at least one time-dependent acoustic data signal 142 to a frequency-domain spectrum using at least one of a fast Fourier transform or a discrete Fourier transform. In some examples, transformation module 252 may perform the transformation before, during or after other processing such as filtering described above.

The technique of FIG. 3 further includes determining, by correlation module 254 of computing device 180, a process attribute of the plurality of process attributes by identifying at least one characteristic of the frequency-domain spectrum (360). As described above, in some examples, each process attribute of the plurality of process attributes is associated with at least one respective frequency band in the frequency-domain spectrum. For example, wear of component 102 may be associated with a first frequency band, and flow through fluid pathway 110 may be associated with a second frequency band. Other examples are also contemplated, for example, those described with respect to FIG. 1. Therefore, correlation module 254 may determine the process attribute based at least in part on the identified at least characteristic of the frequency-domain spectrum according to one or more example techniques described below.

Computing device 180 may identify at least one characteristic of the frequency-domain spectrum using one or more of the example techniques described below. In some examples, correlation module 254 may analyze the entire frequency-domain spectrum to identify at least one characteristic of the frequency-domain spectrum (360). For example, correlation module 254 may compare the entire frequency-domain spectrum with a second frequency-domain spectrum to identify at least one characteristic of the frequency-domain spectrum (360). In some examples, the second frequency-domain spectrum may be a known or reference frequency-domain spectrum, such as sample frequency-domain spectrum obtained from another known system performing a known fluid transport or a calculated frequency-domain spectrum. In this way, correlation module 254 may compare the entire frequency-domain spectrum to a frequency-domain spectrum representative of expected operation of system 100.

In other examples, the second frequency-domain spectrum may be a past frequency-domain spectrum obtained from at least one time-dependent acoustic data signal 142 over a past interval of time from system 100. The second frequency-domain spectrum may include, for example, a past frequency-domain spectrum obtained during the process, so that correlation module 254 compares the frequency-domain spectrum at a present interval of time with the frequency-domain spectrum at a past interval of time to identify the at least one characteristic. In this way, correlation module 254 may identify changes of the frequency-domain spectrum relative to past operation of system 100 and may determine changes over time of operation of system 100.

In some examples, correlation module 254 may then determine the process attribute by at least selecting at least one of a representative frequency or a representative intensity of the frequency within the frequency-domain spectrum as the at least one characteristic based on the comparison of the entire frequency-domain spectrum with the known frequency-domain spectrum (360). For example, correlation module 254 may identify at least one frequency for which an intensity has changed between the second frequency-domain spectrum and the frequency-domain spectrum determined based on at least one time-dependent acoustic data signal 142, and may select that frequency as the process attribute or for use in determining the process attribute. In some examples, correlation module 254 may identify a plurality of respective frequencies for which a respective intensity has changed between the second frequency-domain spectrum and the frequency-domain spectrum determined based on at least one time-dependent acoustic data signal 142, and may select each respective frequency as a process attribute or for use in determining a respective process attribute. In this way, in some examples, correlation module 254 may determine a plurality of process attributes for system 100 based at least in part on at least one time-dependent acoustic data signal 142.

In other examples, instead of analyzing the entire frequency-domain spectrum, correlation module 254 may analyze a selected portion of the frequency-domain spectrum to identify at least one characteristic of the frequency-domain spectrum (360). For example, identifying at least one characteristic of the frequency-domain spectrum (360) may include filtering, by acoustic data signal processing module 250, the at least one time-dependent acoustic data signal 142 to select a frequency band prior to transforming, by transformation module 252, at least one time-dependent acoustic data signal 142 to the frequency-domain spectrum (340), or selecting, by acoustic data signal processing module 250, a frequency band from the frequency-domain spectrum. In some examples, identifying the at least one characteristic of the frequency-domain spectrum (360) may further include analyzing, by correlation module 254, the selected frequency band to identify at least one characteristic of the frequency-domain spectrum (360). In some examples, correlation module 254 may compare the selected frequency band with a second frequency band, which may be analogous to the second frequency-domain spectrum described above. For example, the second frequency band may be a known or reference frequency-domain spectrum or may be a past frequency-domain spectrum obtained from at least one time-dependent acoustic data signal 142.

In some examples, determining the process attribute may include selecting, by correlation module 254, at least one of a frequency or an intensity of the frequency within the selected frequency band as the at least one characteristic based on the comparison of the selected frequency band with the known frequency band (360). For example, correlation module 254 may extract a plurality of intensities from a selected frequency band of the frequency-domain spectrum, each intensity of the plurality of intensities corresponding to a respective frequency of a plurality of frequencies within the selected frequency band. In some examples, correlation module 254 may select at least one of an intensity of the plurality of intensities or the respective frequency of the plurality of frequencies as the at least one characteristic. In some examples, correlation module 254 may identify the maximum intensity of the plurality of intensities and select at least one of the maximum intensity (for instance, peak intensity) or the frequency associated with the maximum intensity (for instance, peak frequency) as the at least one characteristic.

In some examples, after determining the at least one characteristic of the frequency-domain spectrum, correlation module 254 may compare the at least one characteristic with a characteristic value or range of characteristic values to determine the process attribute (360). The at least one characteristic and the known or expected characteristic value or range of characteristic values may relate to aspects of process attributes (e.g., magnitude, variation, or the like), which may be associated with frequency values within a frequency band, may be associated with intensities of one or more frequencies within a frequency band, or both. For example, the magnitude of a process attribute may be related to the magnitude of intensities of at least one frequency within the respective frequency band associated with the process attribute, and changes in the process attribute may result in changes in the respective frequency band associated with the process attribute. In some of these examples, increases or decreases in the magnitude of a process attribute may result in corresponding increases or decreases in intensities of one or more frequencies within the respective frequency band associated with the process attribute. Alternatively or additionally, the occurrence of a phenomenon within system 100 may result in a change in the peak frequency, peak intensity, or both, exhibited by the respective frequency band associated with the process attribute responsible for the occurrence of the phenomenon. Therefore, correlation module 254 may compare the compare the at least one characteristic with a known or expected characteristic value or range of characteristic values to determine the process attribute.

Correlation module 254 may compare the at least one characteristic with a known or expected characteristic value or range of characteristic values to determine the process attribute using one or more of the following example techniques. In some examples, correlation module 254 may select the known or expected characteristic value or range of characteristic values from a second frequency-domain spectrum, such as a known frequency-domain spectrum obtained from a test or experimental process or a frequency-domain spectrum from a past time interval of the present process. In some examples, the known frequency-domain spectrum may include a frequency-domain spectrum obtained from fluid transport that resulted in satisfactory product characteristics. In other examples, the known frequency-domain spectrum may be a reference frequency-domain spectrum that includes expected or nominal frequency content based on expected or nominal process attributes. Thus, comparing the at least one characteristic with known or expected characteristic value or range of characteristic values may allow correlation module 254 to determine the deviation or variation of a process attribute of the present process from the process attribute of a known process.

Comparing the at least one characteristic with a characteristic value or range of characteristic values obtained from the frequency-domain spectrum over a past time interval (360) may allow correlation module 254 to determine the change in the process attribute from the past time interval to the present time interval. In some examples, correlation module 254 may determine an increase or decrease in the intensity of a frequency in a selected frequency band compared to an intensity in the past frequency-domain spectrum as indicative of a respective increase or decrease in the magnitude of a process attribute associated with the selected frequency band.

In some examples, correlation module 254 identifies the at least one characteristic at a first interval of time, and compares it with a known characteristic value that is a value of the at least one characteristic at a second interval of time. In some examples, the first interval of time may be a present or recent interval of time, and the second interval of time may be a past interval of time. In some examples, the first interval of time may be associated with a known system performance, for instance, a known magnitude of a process attribute, and the second interval of time may be associated with an unknown system performance, for instance, an unknown magnitude of a process attribute. In some examples, correlation module 254 identifies the at least one characteristic at the first interval of time, and compares the at least one characteristic with a known or predetermined characteristic value or known or predetermined characteristic value range. In some examples, the at least one characteristic at the first interval of time includes at least one of an average intensity of the frequency-domain spectrum, a peak intensity of the frequency-domain spectrum, a selected frequency of the frequency-domain spectrum, or a frequency associated with a peak intensity of the frequency-domain spectrum and the predetermined characteristic value range includes a range of the corresponding characteristic.

In some examples, the process attribute may include component wear, the at least one characteristic includes a peak frequency, and the predetermined characteristic value range includes a range of frequencies. In other examples, the process attribute includes component wear, the at least one characteristic includes a peak intensity, and the known intensity value is associated with component wear. In other examples, the process attribute includes fluid flow characteristic (e.g., pressure, flow rate, or temperature), the at least one characteristic includes a peak frequency, and the known frequency value is associated with the fluid flow characteristic. In some examples, the process attribute includes blockage of a line or a component, the at least one characteristic includes a peak frequency associated with blockage.

In these ways, correlation module 254 may determine at least one process attribute of the plurality of process attributes. In some examples, system 100 may perform a process possessing a plurality of process attributes. In some examples, identifying the magnitude of a process attribute may be desirable. Correlation module 254 may determine the process attribute, for instance, a process parameter that may include at least one of a temperature, a pressure, a mass flow rate, a volumetric flow rate, a molecular flow rate, a molar flow rate, a composition or a concentration, of a flowstream flowing through system 100, for instance, of fluid flowing through component 102, chamber 108, fluid pathway 110, inlet 112, outlet 114, pump 120, fluid supply 122, or line 124, based at least in part on at least one time-dependent acoustic signal 142.

In some examples, system 100 may exhibit unsatisfactory performance for an unknown reason that may be related to a process deviation. Computing device 180 may analyze at least one time-dependent acoustic data signal 142 by one or more example techniques described above with reference to FIG. 3 to determine the process deviation. In some examples, the process deviation may include at least one of fluid fluctuation; flow blockage (for e.g., of one or more of component 102, chamber 108, fluid pathway 110, inlet 112, outlet 114, pump 120, fluid supply 122, or line 124); fluid leakage; a process deviation resulting from incompatibility (for e.g., wrong type or configuration of a component); or wear or blockage of the at least one component, which may include at least one of wear or blockage of component 102, chamber 108, fluid pathway 110, inlet 112, outlet 114, pump 120, fluid supply 122, or line 124.

In this way, computing device 180 may perform the examples techniques described above with reference to FIG. 3 to analyze at least one time-dependent acoustic data signal 142 to determine process attributes for a plurality of components of system 100 performing a process, and determine whether process attributes are within a nominal or expected range, or if the process attributes are varying compared to an expected value.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

Various examples have been described. These and other examples are within the scope of the following claims.

The invention claimed is:

1. A system comprising:

at least one acoustic sensor configured to generate at least one time-dependent acoustic data signal indicative of an acoustic signal generated by a system performing a fluid transport process possessing a plurality of process attributes, the fluid transport process comprising a flow of a fluid along at least one path;

a system component comprising at least one of a container, a tank, a nozzle, an injector, a port, or a turbine defining at least a portion of the at least one path for the flow of the fluid; and a computing device comprising:

an acoustic data signal processing module configured to:

receive the at least one time-dependent acoustic data signal; and transform the at least one time-dependent acoustic data signal to a frequency-domain spectrum, wherein each process attribute of the plurality of process attributes is associated with at least one respective frequency band; and a correlation module configured to determine a process attribute of the plurality of process attributes by identifying at least one characteristic of the frequency-domain spectrum and at least comparing the at least one characteristic at a first interval of time with the at least one characteristic at a second interval of time.

2. The system of claim 1, wherein the acoustic data signal processing module is configured to transform the at least one time-dependent acoustic data signal to the frequency-domain spectrum using at least one of a discrete Fourier transform or a fast Fourier transform.

3. The system of claim 1, wherein the correlation module is configured to determine the process attribute by at least:

extracting a plurality of intensities from a selected frequency band of the frequency-domain spectrum, each intensity of the plurality of intensities corresponding to a respective frequency of a plurality of frequencies within the selected frequency band; and selecting at least one of an intensity of the plurality of intensities or the respective frequency of the plurality of frequencies as the at least one characteristic.

4. The system of claim 1, wherein the at least one characteristic comprises at least one of a peak frequency or a peak intensity.

5. The system of claim 1, wherein the correlation module is further configured to determine the process attribute by at least comparing the at least one characteristic at a third interval of time with a predetermined characteristic value range.

6. The system of claim 1, wherein the correlation module is further configured to determine the process attribute by at least comparing the at least one characteristic at a fourth interval of time with a respective known characteristic of a known frequency-domain spectrum.

7. The system of claim 1, wherein the process attribute of the plurality of process attributes comprises at least one of:

a process parameter comprising at least one of a temperature, a pressure, a mass flow rate, a volumetric flow rate, a molecular flow rate, a molar flow rate, a composition or a concentration, of a flowstream; or a process deviation status comprising at least one of a fluid blockage, a fluid leakage, a fluid fluctuation, or a process deviation resulting from incompatibility, wear, or blockage of the system component.

8. The system of claim 1, wherein the computing device further comprises an output device configured to output a representation of at least one of the at least one time-dependent acoustic data signal, the frequency-domain spectrum, the at least one characteristic of the frequency-domain spectrum, or the process attribute of which the at least one characteristic is indicative.

9. The system of claim 1, wherein the fluid transport process comprises at least one of fluid introduction, fluid discharge, or fluid flow.

10. A method comprising:

receiving, by a computing device, from at least one acoustic sensor, at least one time-dependent acoustic data signal indicative of an acoustic signal generated by a system performing a fluid transport process possessing a plurality of process attributes, the fluid transport process comprising a flow of a fluid along at least one path, the system comprising at least one of a container, a tank, a nozzle, an injector, a port, or a turbine defining at least a portion of the at least one path for the flow of the fluid;

transforming, by the computing device, the at least one time-dependent acoustic data signal to a frequency-domain spectrum, wherein each process attribute of the plurality of process attributes is associated with at least one respective frequency band; and determining, by the computing device, a process attribute of the plurality of process attributes by identifying at least one characteristic of the frequency-domain spectrum and at least comparing the at least one characteristic at a first interval of time with the at least one characteristic at a second interval of time.

11. The method of claim 10, wherein transforming the at least one time-dependent acoustic data signal into the frequency-domain spectrum comprises performing at least one of a discrete Fourier transform or a fast Fourier transform.

12. The method of claim 10, wherein determining the process attribute comprises:

extracting a plurality of intensities from a selected frequency band of the frequency-domain spectrum, each intensity of the plurality of intensities corresponding to a respective frequency of a plurality of frequencies within the selected frequency band; and selecting at least one of an intensity of the plurality of intensities or the respective frequency of the plurality of frequencies as the at least one characteristic.

13. The method of claim 10, wherein the at least one characteristic comprises at least one of a peak frequency or a peak intensity.

14. The method of claim 10, wherein determining the process attribute further comprises comparing the at least one characteristic at a third interval of time with a respective predetermined characteristic value range.

15. The method of claim 10, wherein determining the process attribute further comprises comparing the at least one characteristic at a fourth interval of time with a respective known characteristic of a known frequency-domain spectrum.

16. The method of claim 10, wherein the process attribute of the plurality of process attributes comprises at least one of:

a process parameter comprising at least one of a temperature, a pressure, a mass flow rate, a volumetric flow rate, a molecular flow rate, a molar flow rate, a composition or a concentration, of a flowstream; or a process deviation status comprising at least one of a fluid blockage, a fluid leakage, a fluid fluctuation, or a process deviation resulting from incompatibility, wear, or blockage of a system component.

17. A computer readable storage medium comprising instructions that, when executed, cause at least one processor to:

receive, from at least one acoustic sensor, at least one time-dependent acoustic data signal indicative of an acoustic signal generated by a system performing a fluid transport process possessing a plurality of process attributes, the fluid transport process comprising a flow of a fluid along at least one path, the system comprising at least one of a container, a tank, a nozzle, an injector, a port, or a turbine defining at least a portion of the at least one path for the flow of the fluid;

transform the at least one time-dependent acoustic data signal to a frequency-domain spectrum, wherein each process attribute of the plurality of process attributes is associated with at least one respective frequency band; and determine a process attribute of the plurality of process attributes by identifying at least one characteristic of the frequency-domain spectrum and at least comparing the at least one characteristic at a first interval of time with the at least one characteristic at a second interval of time.

* * * * *